United States Patent
Bertz et al.

(10) Patent No.: US 9,065,704 B1
(45) Date of Patent: Jun. 23, 2015

(54) PARALLEL ADAPTATION OF DIGITAL CONTENT

(75) Inventors: Lyle T. Bertz, Lee's Summit, MO (US); Arun Rajagopal, Leawood, KS (US)

(73) Assignee: Sprint COmmunications Company L.P., Overland Park, KS (US)

( * ) Notice: Subject to any disclaimer, the term of this patent is extended or adjusted under 35 U.S.C. 154(b) by 289 days.

(21) Appl. No.: 13/490,253

(22) Filed: Jun. 6, 2012

(51) Int. Cl.
  G06F 15/16 (2006.01)
  H04L 29/08 (2006.01)
  G06Q 30/02 (2012.01)
  H04L 29/06 (2006.01)

(52) U.S. Cl.
  CPC .......... *H04L 29/08072* (2013.01); *G06Q 30/02* (2013.01); *H04L 29/06* (2013.01); *H04L 29/0809* (2013.01)

(58) Field of Classification Search
  CPC .............. H04L 29/08072; H04L 29/06; H04L 29/0809; H04L 29/08981; G06Q 30/02
  USPC .................... 709/217; 711/123, 126
  See application file for complete search history.

(56) References Cited

U.S. PATENT DOCUMENTS

| | | | |
|---|---|---|---|
| 7,890,586 B1 * | 2/2011 | McNamara et al. | 709/206 |
| 2004/0181550 A1 * | 9/2004 | Warsta et al. | 707/104.1 |
| 2006/0184638 A1 * | 8/2006 | Chua et al. | 709/217 |
| 2006/0256130 A1 * | 11/2006 | Gonzalez | 345/619 |
| 2010/0094975 A1 * | 4/2010 | Zuckerman et al. | 709/219 |

OTHER PUBLICATIONS

Jian Liang, Rakeshkumar, Keith w. Ross; Understanding KaZaA, Polytechnic University, Dept. of Computer and Information Science, posted on May 6, 2004. Retrieved from http://cis.poly.edu/~ross/papers/understanding KaZaA.pdf.*

* cited by examiner

*Primary Examiner* — Oleg Survillo
*Assistant Examiner* — Mehulkumar Shah

(57) ABSTRACT

Adapting digital content to be provided to a computing device may include a variety of elements. For example, when digital content is requested, a version of the digital content may be split into segments, which are adapted in parallel. The adapted segments may then be provided to the computing device in a recombined version of the digital content or as individual segments.

7 Claims, 4 Drawing Sheets

PARALLEL ADAPTATION OF DIGITAL CONTENT

SUMMARY

A high-level overview of various aspects of the invention is provided here to provide an overview of the disclosure and to introduce a selection of concepts, which are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, adapting digital content to be provided to a computing device.

BRIEF DESCRIPTION OF THE SEVERAL VIEWS OF THE DRAWINGS

Illustrative embodiments of the present invention are described in detail below with reference to the attached drawing figures, which are incorporate herein by reference, wherein.

DETAILED DESCRIPTION

The subject matter of select embodiments of the present invention is described with specificity herein to meet statutory requirements. But the description itself is not intended to define what is regarded as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Generally, subject matter described herein is related to adapting digital content (e.g., video content) to be delivered to a computing device. Adapting digital content may include various steps, such as splitting a version of the digital content into content segments, each of which is transmitted to a respective adaptation server. The plurality of adaptation servers adapts the content segments in parallel to create a plurality of adapted segments. The adapted segments may then be provided to the computing device. For example, the adapted segments may be recombined by a network component into an adapted version of the digital content that is provided to the computing device. In addition, each of the adapted segments may be individually provided to the computing device, which renders the adapted segments in a unified manner.

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. For example, computer-readable media include media implemented in any way for storing information readable by a computing device. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
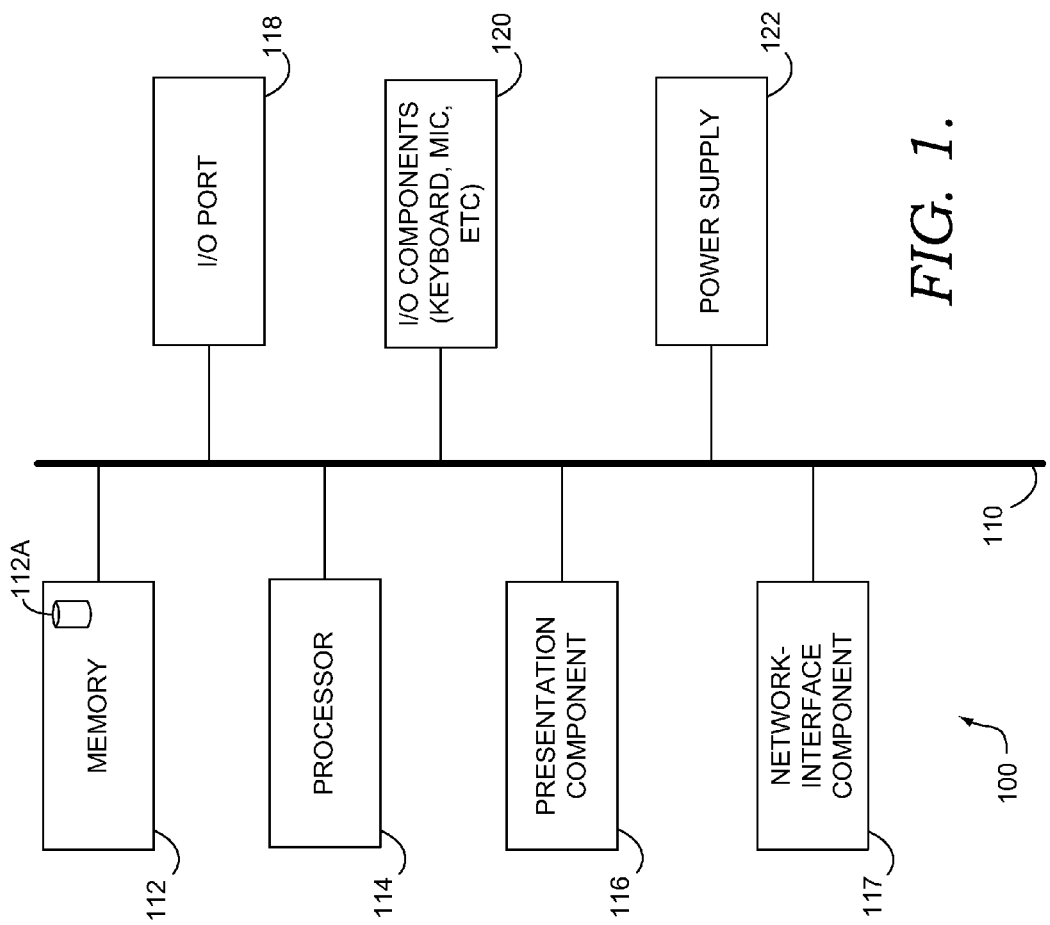
FIG. 1 depicts an exemplary computing device in accordance with an embodiment of the present invention.

Turning now to FIG. 1, a block diagram of an illustrative computing device 100. Computing device 100 may include various types of devices, such as a mobile phone, a tablet, a desktop, a laptop, a notebook, a netbook, and the like. For simplicity, consistency, and readability, the term "mobile device" may be used throughout this description, but this technology may not be limited to only mobile devices and may be employed with a wide variety of computing devices. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a network-interface component 117 (e.g., radio), input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or lighted keyboards).

Network-interface component 117 may include a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications. However, computing device 100 may communicate with various types of networks, including both wireless and wireline.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
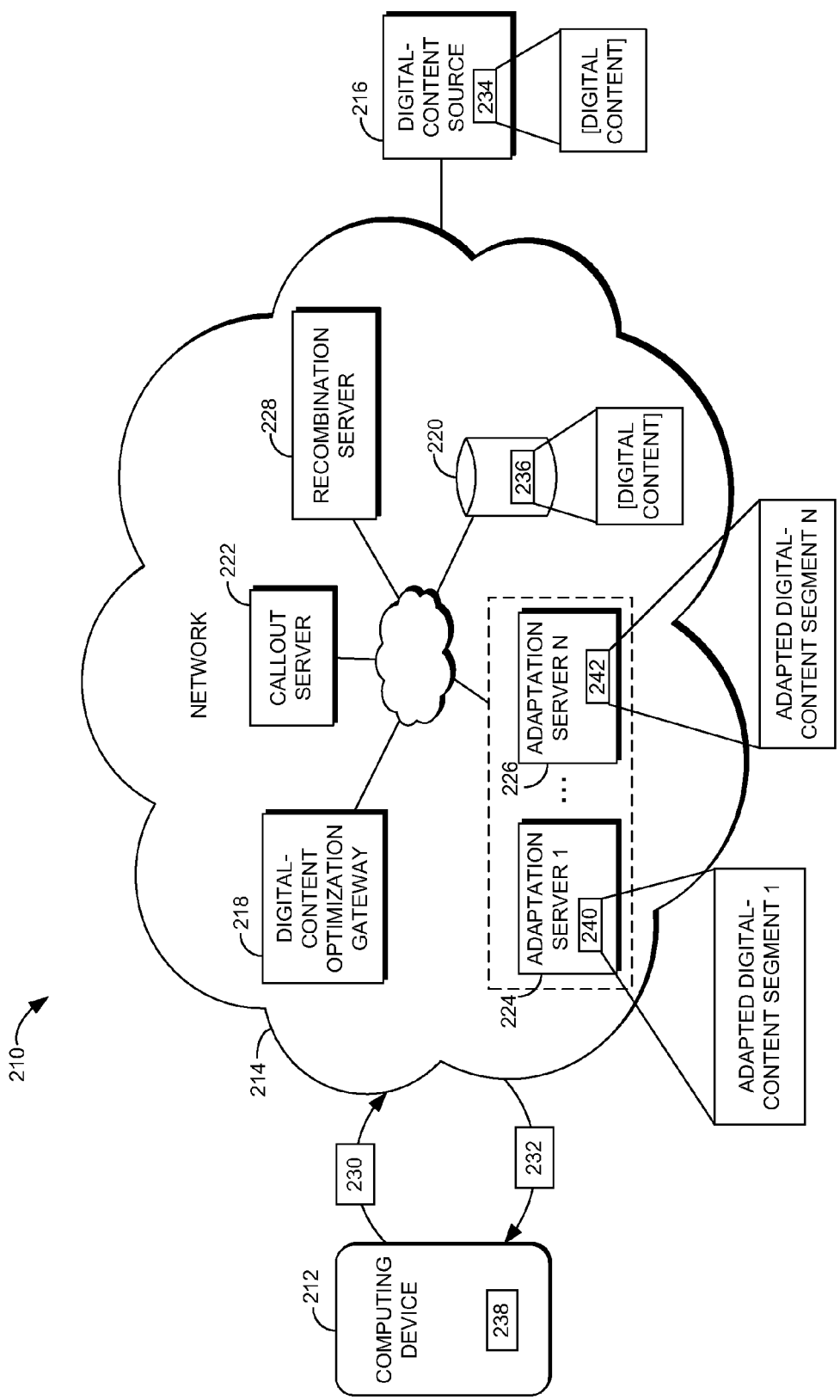
FIG. 2 depicts an exemplary computing environment in accordance with an embodiment of the present invention.

Turning now to FIG. 2, an exemplary computing environment 210 is depicted that includes a mobile computing device 212 ("mobile device") in communication with network 214 ("network"), which may include a mobile telecommunications network. FIG. 2 also illustrates that network 214 communicates with a digital-content source 216 and includes a variety of different network components.

Exemplary network components depicted in FIG. 2 include a digital-content optimization gateway 218, a network data store 220, a callout server 222, adaptation servers 224 and 226, and a recombination server 228. These network components are linked with and communicate with one another, and operations of these network components will be described in more detail in another portion of this description.

Mobile device 212 may be similar to mobile device 100 that is described with respect to FIG. 1. That is, mobile device 212 may include various components that enable communication with network 214. As such, mobile device 212 sends information 230 to, and receives information 232 from, network 214. For example, mobile device 212 may send voice and text data to network 214, as well as receive voice and text data from network 214. In addition, mobile device 212 may send requests to network 214 requesting that digital content (e.g., 234 or 236) be provided to mobile device 212.

In addition, mobile device 212 may include software or hardware computing components 238 that present received digital content. For example, these computing components 238 may present digital content using a combination of mobile-device settings, user preferences, user settings, digital-content-playback software, browser, display component, and speakers. The computing components 238 of mobile device 212 that function to present digital content include certain content-rendering capabilities and limitations, which may affect the version of digital content that mobile device 212 should receive for the digital content to be rendered in a desired manner.

Mobile device 212 may render various type of digital content. For example, mobile device 212 may render video content, audio content, text-message content, email-message content, image content, and the like. Execution of a variety of digital content is contemplated within the scope of our invention.

In an embodiment of the present invention, digital content (e.g., 234 or 236) that is requested by mobile device 212 may be adapted in various ways to be more consistent with the content-rendering capabilities and limitations of computing components 238. The aptness of such adaptation may be determined in various manners. For example, a communication (e.g., 230) from mobile device 212 requesting digital content (e.g., 234 or 236) may request that the digital content include adapted features (e.g., subtitles). In another example, network 214 may store and maintain user settings or preferences and device settings that are applied to mobile device 212. As such, the stored settings may be referenced, when mobile device 212 requests content, to determine that the requested content should be adapted for compliance with the settings.

As previously indicated, network 214 includes various network components that communicate with one another within network 214. For example, network 214 includes a digital-content optimization gateway 218, which receives requests from mobile device 212 to provide digital content. In addition, digital-content optimization gateway 218 may retrieve a version of the requested digital content from various sources. For example, the digital-content optimization gateway 218 may request the digital content 234 from a non-network content source (e.g., third-party content provider) or may retrieve a cached copy of the digital content 236 from network data store 220.

Once a version of the digital content is retrieved, digital-content optimization gateway 218 may determine whether the digital content should be adapted. For example, the digital-content optimization gateway 218 may compare a retrieved version of the digital content to the mobile-device request to determine whether adaptation of the digital content is needed to comply with the mobile-device request. That is, information (e.g., user settings/preferences, device settings, browser version, digital-content-playback-software version, etc.) included in the mobile-device request may indicate whether adaptation should occur. In addition, the digital-content optimization gateway 218 may compare the retrieved version of the digital content to stored settings (e.g., user settings/preferences, device settings, browser version, digital-content-playback-software version, etc.) to determine whether adaptation should occur.

Network 214 also includes callout server 222, which executes various tasks related to adaptation of digital content, and callout server 222 may receive a version of the digital content from various sources. For example, callout server 222 may receive a version of the digital content from digital-content optimization gateway 218, in addition to a request from digital-content optimization gateway 218 that the version of digital content be adapted. In addition, callout server 222 may retrieve the version of digital content from content source 216 or from data store 220 when digital-content optimization gateway 218 requests adaptation.

In one embodiment of the present invention, callout server 222 splits the retrieved version of digital content into digital-content segments. The callout server 222 may consider various factors when determining how to split the digital content. For example, one factor may include a quantity of adaptation servers (e.g., 224 and 226) that is available to adapt the digital content. In this regard, callout server 222 may split the digital content into a quantity of segments that is equal to a quantity of adaptation servers available to execute adaptation functionality.

In one embodiment, callout server 222 splits the digital content into segments that are the same or similar size (e.g., same file size, same duration, etc.). In another embodiment, the callout server 222 assesses the workloads of each of the adaptation servers when determining how to split a version of digital content. For example, adaptation server 224 may have more available computing resources (e.g., 50% more) than adaptation server 226. As such, if only servers 224 and 226 were being used for adaptation, callout server 222 may divide the digital content into segments that are sized in proportion (e.g., ⅗ and ⅖) to the amount of available resources on each adaptation server. In a further embodiment, callout server 222 assesses the amount of adaptation that may be applied to the digital content and splits the digital content based on the assessment. For example, callout server 222 may analyze the digital content and determine that the first half of the digital content may need twice as much adaptation than the second half of the digital content. As such, callout server 222 may split the digital content into three segments, such that the first half of the digital content is divided into two segments and the second half of the digital content makes up an entire single segment.

Network 214 also includes adaptation servers 224 and 226. FIG. 2 illustrates a first adaptation server 224 and another adaptation server 226. Adaptation server 224 is labeled "1" and adaptation server 226 is labeled "N" to convey that network 214 may include any number of adaptation servers. For example, network 214 may include a quantity of adaptation servers from 1 to 5.

Adaptation servers 224 and 226 function to transform digital-content segments by applying various adaptation techniques. For example, an adaptation server may adapt digital content by translating written or audio content into a different language, adding subtitles, transforming the computing language from one format to another, modifying a content size, modifying a content quality, and the like. This list of adaptations is merely exemplary, and a variety of other adaptations may also be carried out by adaptation servers in accordance with the present invention. For illustrative purposes, FIG. 2 depicts that adaptation server 224 includes "adapted digital-content segment 1" 240 and adaptation server 226 includes "adapted digital-content segment N" 242. Once segments 240 and 242 have been adapted, they can be provided to mobile device 212.

Adapted segments 240 and 242 may be provided to mobile device 212 in various manners. In one embodiment, adapted segments 240 and 242 are transmitted to recombination server 228. Recombination server 228 combines adapted segments 240 and 242 into an adapted version of digital content 234 or 236. Recombination server 228 may provide the adapted version of digital content directly to mobile device 212. In another embodiment, recombination server 228 transmits the adapted version of digital content to digital-content optimization gateway 218, which then transmits the adapted version to mobile device 212.

In another embodiment, adapted segments 240 and 242 are provided directly from adaptation servers 224 and 226 to mobile device 212. That is, the respective addresses of adaptation servers 224 and 226 are provided to mobile device 212, which then requests the adapted segments directly from the adaptation servers. Upon receiving the adapted segments, mobile device 212 may sequentially playback the adapted segments to present the adapted version of digital content. As such, mobile device 212 may request and download the various adapted segments in parallel from each adaptation server of the plurality of adaptation servers.

The components depicted in FIG. 2 provide for parallel adaptation of digital content that is to be provided to a mobile device. By applying a parallel-adaptation model, adapted digital content may be provided to mobile device 212 in real time (i.e., in response to a request from mobile device). Adaptation of digital content is often a resource-intensive and time-intensive process. Absent the subject matter described herein, adaptation may be attempted by a single computing device, such as the callout server. However, adaptation by a single computing device may require an amount of processing time that is too long and may result in various undesirable consequences. For example, based on the extensive resources and prolonged processing time, the network may choose not to provide adaptation services. Also, the long processing time may result in a negative user experience. As such, parallel adaptation often speeds up processing time and allows for more efficient usage of computing resources, such that adapted digital content may be provided to a mobile device in a manner that does not detract from the user experience.

Figure 3:
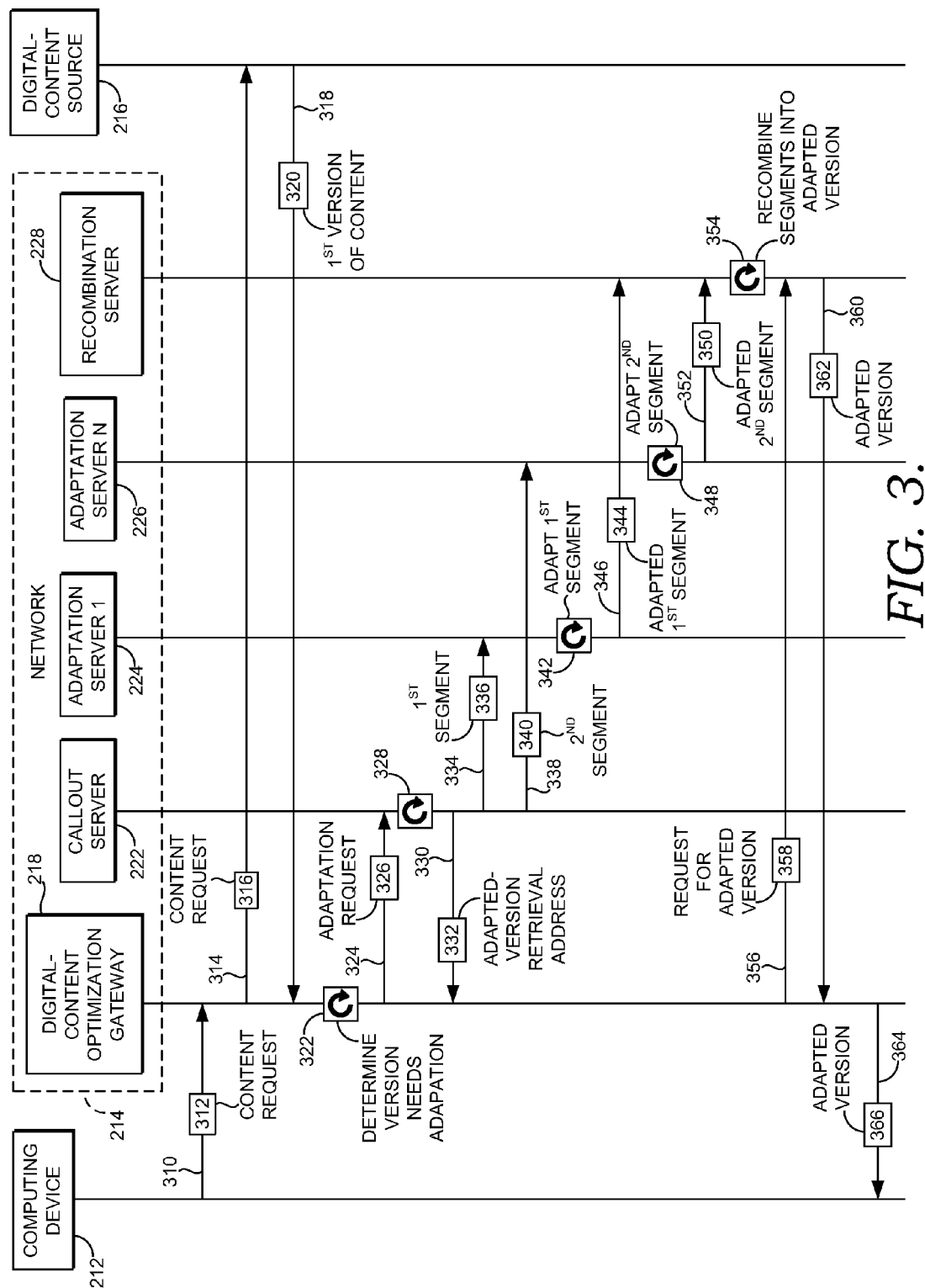
FIGS. 3 and 4 depict a respective series of actions and/or tasks that may be carried out in accordance with an embodiment of the present invention.

Referring now to FIG. 3, a method of adapting digital content to be delivered to a mobile device is depicted. The various tasks and steps that are depicted in FIG. 3 may be carried out by the components described in FIG. 2. As such, FIG. 3 also depicts mobile device 212, network 214, digital-content optimization gateway 218, callout server 222, adaptation server 224, adaptation server 226, recombination server 228, and digital-content source 216. In addition, one or more of the steps and tasks represented in FIG. 3 may be embodied on computer-readable media included among the various components 218, 222, 224, 226, and 228, which is readable by a computing device to carry out the step or task. Although the steps and tasks depicted in FIG. 3 are described in an order, the steps may not be carried out in the same order in which they are described.

At step 310, mobile device 212 transmits a content request 312 to digital-content optimization gateway 218. As previously indicated, the content request 312 may include instructions that indicate a particular version of digital content that should be provided to mobile device 212 or that indicate capabilities and limitations of mobile device 212. At 314, digital-content optimization gateway 218 transmits a content request 316 to a digital-content source 216. Although for illustrative purposes FIG. 3 includes external source 216, the digital-content optimization gateway 218 could also request the digital content from a network source (e.g., cached version of digital content).

At step 318, a first version of the digital content 320 is transmitted to the digital-content optimization gateway 218. At 322, the digital-content optimization gateway 218 determines that the first version 320 should be adapted for transmission to the mobile device 212. For example, the digital-content optimization gateway 218 may compare the first version 320 to the content request 312. In addition, the digital-content optimization gateway may compare the first version 320 to information that is stored by network 214 and that relates to mobile device 212.

At step 324, digital-content optimization gateway 218 transmits an adaptation request 326 to callout server 222. At 328, callout server 222 determines an adaptation process for the first version 320. For example, callout server 222 splits the first version 320 into content segments. As previously described, the content segments may be similarly sized parts of the first version, or alternatively may be split into segments based on a respective workload of the adaptation servers. In addition, callout server 222 may generate the content segments based on the amount of adaptation required in different parts of the first version 320.

At 330, callout server 222 transmits a communication 332 to digital-content optimization gateway 218 that notifies the digital-content optimization gateway 218 from which server to retrieve the adapted digital content. For example, communication 332 may be part of a session description and may include an address for recombination server 228. At 334, callout server 222 sends a first segment 336 of the first version 320 to adaptation server 224. At 338, callout server 222 transmits a second segment 340 to adaptation server 226.

At step 342, adaptation server 224 adapts the first segment 336, and the adapted first segment 344 is transmitted 346 to recombination server 228. At step 348, adaptation server 226 adapts the second segment 340, and the adapted second segment 350 is transmitted 352 to recombination server 228. Executing steps 342 and 348, first version 320 is adapted in parallel by the adaptation servers.

Step 354 includes recombining the adapted segments into an adapted version of the digital content. At step 356, the digital-content optimization gateway 218 transmits a content request 358 to the recombination server 228 using the information provided in the communication 332. In response, recombination server 228 transmits 360 the adapted version of the digital content 362 to the digital-content optimization gateway 218. At step 364, the digital-content optimization gateway 218 provides the adapted version of the digital content 366 to the mobile device 212.

Figure 4:
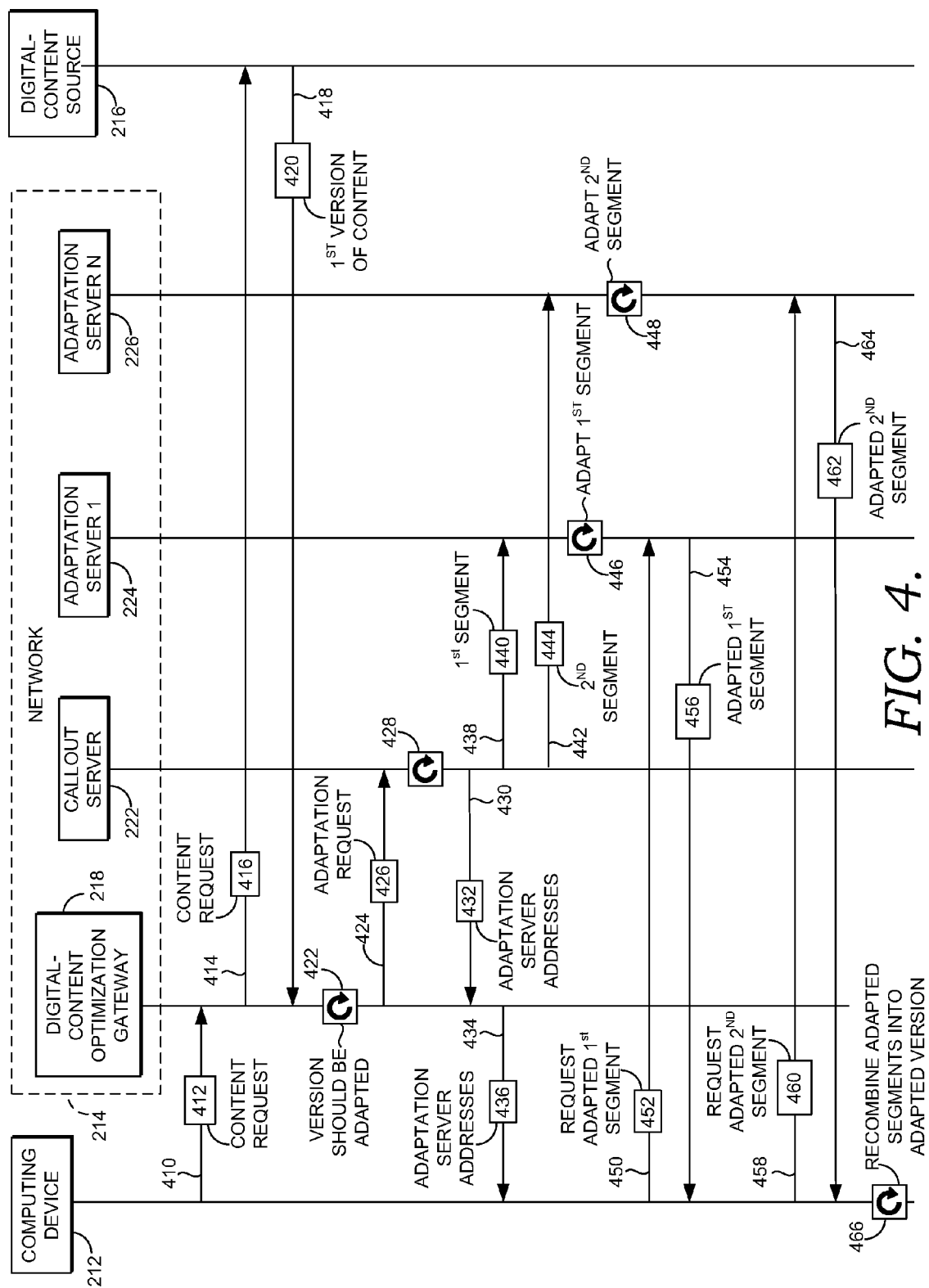

Referring now to FIG. 4, another method of adapting digital content to be delivered to a mobile device is depicted. The various tasks and steps that are depicted in FIG. 4 may be carried out by the components described in FIG. 2. As such, FIG. 4 also depicts mobile device 212, network 214, digital-content optimization gateway 218, callout server 222, adaptation server 224, adaptation server 226, and digital-content source 216. In addition, one or more of the steps and tasks represented in FIG. 4 may be embodied on computer-readable media, which is readable by a computing device to carry out the step or task. Although the steps and tasks depicted in FIG. 4 are described in an order, the steps may not be carried out in the same order in which they are described.

Many of the steps and tasks depicted in FIG. 4 are similar to those in FIG. 3, and those steps and tasks are again described in this portion of the description in the context of FIG. 4. However, FIG. 4 illustrates an alternative manner in which the adapted content is delivered to the mobile device 212.

At step 410, mobile device 212 transmits a content request 412 to digital-content optimization gateway 218. As previously indicated, the content request 412 may include instructions that indicate a particular version of digital content that should be provided to mobile device 212 or that indicate capabilities and limitations of mobile device 212. At 414, digital-content optimization gateway 218 transmits a content request 416 to a digital-content source 216. Although for illustrative purposes FIG. 4 includes external source 216, the digital-content optimization gateway 218 could also request the digital content from a network source (e.g., cached version of digital content).

At step 418, a first version of the digital content 420 is transmitted to the digital-content optimization gateway 218. At 422, the digital-content optimization gateway 218 determines that the first version 420 should be adapted for transmission to the mobile device 212. For example, the digital-content optimization gateway 218 may compare the first version 420 to the content request 412. In addition, the digital-content optimization gateway 218 may compare the first version 420 to information (e.g., user preferences, user settings, mobile-device settings, mobile-device software, mobile-device hardware, etc.) that is stored by network 214 and that relates to mobile device 212.

At step 424, digital-content optimization gateway 218 transmits an adaptation request 426 to callout server 222. At 428, callout server 222 determines an adaptation process for the first version 420. For example, callout server 222 splits the first version 420 into content segments. As previously described, the content segments may be similarly sized parts of the first version, or alternatively may be split into segments based on a respective workload of the adaptation servers. In addition, callout server 222 may generate the content segments based on the amount of adaptation required in different parts of the first version 420.

At 430, callout server 222 transmits a communication 432 to digital-content optimization gateway 218 that notifies the digital-content optimization gateway 218 from which server to retrieve adapted digital-content segments. For example, the communication 432 may be part of a session description and may include respective addresses for each of the adaptation servers 224 and 226. Digital-content optimization gateway 218 may then transmit 434 the addresses 436 to mobile device 212.

At 438, callout server 222 sends a first segment 440 of the first version 420 to adaptation server 224. At 442, callout server 222 transmits a second segment 444 to adaptation server 226. Each of the first segment 440 and the second segment 444 may be adapted by respective adaptation servers 224 and 226 at steps 446 and 448, respectively.

FIG. 4 depicts an embodiment of the present invention in which mobile device 212 requests the adapted segments from the adaptation servers. For example, at 450 mobile device 212 sends a request 452 for the adapted first segment to adaptation server 224. In response, at 454 adaptation server 224 transmits the adapted first segment 456 to mobile device 212. In addition, at 458 mobile device 212 sends a request 460 for the adapted second segment 462 to adaptation server 226. In response, at 464 adaptation server 226 transmits the adapted second segment 462 to mobile device 212. Mobile device 212 may receive adapted segments in any order (i.e., sequentially or nonsequentially) and recombine 466 the adapted segments into the adapted version for playback.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of adapting digital content to be delivered to a computing device, the method comprising:
   receiving, by a digital-content optimization gateway operating on a mobile-telecommunications network, a communication requesting that the digital content be provided to the computing device;
   determining by the digital-content optimization gateway that a version of the digital content should be transformed into an adapted version of the digital content, which is to be provided to the computing device in response to the communication;
   requesting, by the digital-content optimization gateway, that a callout server transform the version of the digital content into the adapted version of the digital content;
   splitting by the callout server the version of the digital content into a plurality of digital-content segments;
   transmitting by the callout server each digital-content segment of the plurality of digital-content segments to a respective adaptation server included among a plurality of adaptation servers, wherein the callout server further transmits a session description to the digital-content optimization gateway, the session description comprising one or more addresses of one or more servers from which a plurality of adapted digital-content segments are retrievable;
   adapting the plurality of digital-content segments in parallel by the plurality of adaptation servers to create the plurality of adapted digital-content segments;
   transmitting the one or more addresses that identify the plurality of adaptation servers to the computing device;
   receiving from the computing device one or more requests utilizing the one or more addresses that identify the plurality of adaptation servers to provide the respective adapted digital-content segment; and
   transmitting by the plurality of adaptation servers the plurality of adapted digital-content segments to the computing device in response to receiving the one or more requests.

2. The method of claim 1 further comprising,
   determining by the callout server workloads and capabilities of the plurality of adaptations servers,
   based on the workloads and capabilities, assigning by the callout server a respective adaptation task to each adaptation server of the plurality of adaptation servers, wherein the each digital-content segment is transmitted to the respective adaptation server based on the respective adaptation task.

3. The method of claim 1,
   wherein the plurality of adaptation servers includes a recombination server, and
   wherein the method comprises compiling by the recombination server the plurality of adapted digital-content segments into the adapted version of the digital content, the adapted version of the digital content being retrievable from the recombination server.

4. The method of claim 3, wherein transmitting the plurality of adapted digital-content segments to the computing device includes transmitting the adapted version to the computing device.

5. A system that adapts digital content to be delivered to a computing device, the system comprising:
   a digital-content optimization gateway including a computer processor that receives a communication requesting that the digital content be provided to the computing device, wherein the digital-content optimization gateway determines that a version of the digital content should be transformed into an adapted version of the digital content;
   a callout server including a computer processor that receives a request from the digital-content optimization gateway to transform the version of the digital content, wherein the callout server splits the version of the digital content into a plurality of digital-content segments, which are transmitted to a plurality of adaptation servers, and wherein the callout server further transmits a session description to the digital-content optimization gateway, the session description comprising one or more addresses of the plurality of adaptation servers from which a plurality of adapted digital-content segments are retrievable; and
   the plurality of adaptation servers, each of which receives a respective digital-content segment of the plurality of digital-content segments and adapts the respective digital-content segment,
   wherein the plurality of adaptation servers adapts the plurality of digital-content segments in parallel to create the plurality of adapted digital-content segments,
   wherein the one or more addresses that identify the plurality of adaptation servers are provided to the computing device;
   wherein one or more requests are received from the computing device utilizing the one or more addresses that identify the plurality of adaptation servers to provide the respective adapted digital-content segment; and
   wherein the plurality of adapted digital-content segments is provided to the computing device in response to receiving the one or more requests.

6. Non-transitory computer-storage media storing computer-useable instructions thereon that, when executed, perform a method of adapting digital content to be delivered to a computing device, the method comprising:
   receiving from the computing device a communication requesting that the digital content be provided to the computing device;
   determining by a digital-content optimization gateway that a version of the digital content should be transformed into an adapted version of the digital content, which is to be provided to the computing device in response to the communication;
   transmitting by the digital-content optimization gateway a request for adaptation services to a callout server;
   splitting by the callout server the version of the digital content into a plurality of digital-content segments;
   transmitting by the callout server each digital-content segment of the plurality of digital-content segments to a respective adaptation server included among a plurality of adaptation servers, wherein the callout server further transmits a session description to the digital-content optimization gateway, the session description comprising one or more addresses of the plurality of adaptation servers from which a plurality of adapted digital-content segments are retrievable;
   adapting the plurality of digital-content segments in parallel by the plurality of adaptation servers to create the plurality of adapted digital-content segments;
   transmitting the one or more addresses that identify the plurality of adaptation servers to the computing device;
   receiving from the computing device one or more requests utilizing the one or more addresses that identify the plurality of adaptation servers to provide the respective adapted digital-content segment; and
   transmitting by the plurality of adaptation servers the plurality of adapted digital-content segments to the computing device in response to receiving the one or more requests.

7. The media of claim 6, wherein the method further comprises,
   determining by the callout server workloads and capabilities of the plurality of adaptations servers, and
   transmitting by the callout server the plurality of digital-content segments to the plurality of adaptations servers based on the workloads and capabilities.

* * * * *